(No Model.)
C. E. CUMMINS.
FENCE WIRE WINDER.
No. 598,138. Patented Feb. 1, 1898.
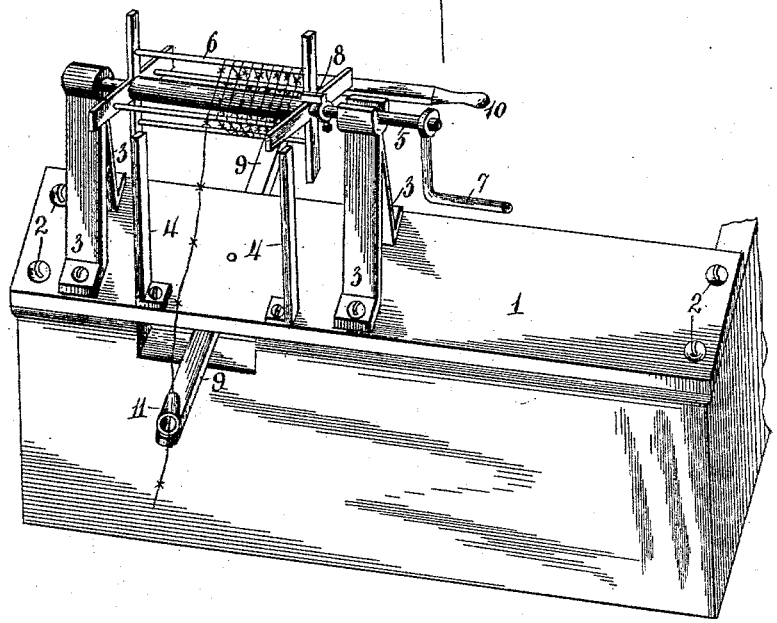
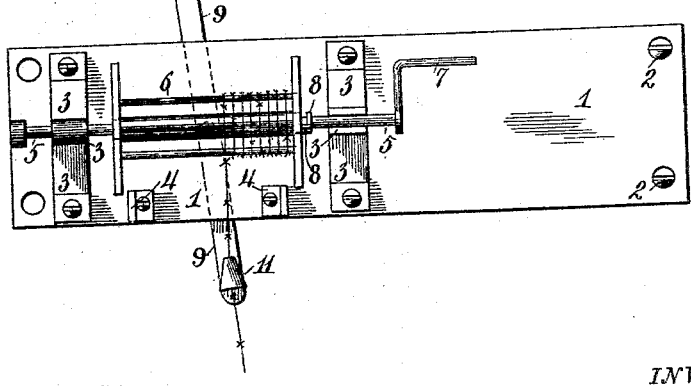
WITNESSES
INVENTOR
Charles E. Cummins
by John Wedderburn
Attorney

UNITED STATES PATENT OFFICE.

CHARLES E. CUMMINS, OF HASTINGS, IOWA.

FENCE-WIRE WINDER.

SPECIFICATION forming part of Letters Patent No. 598,138, dated February 1, 1898.

Application filed November 28, 1896. Serial No. 613,814. (No model.)

*To all whom it may concern:*

Be it known that I, CHARLES E. CUMMINS, a citizen of the United States, residing at Hastings, in the county of Mills and State of Iowa, have invented certain new and useful Improvements in Fence-Wire Winders; and I do hereby declare the following to be a full, clear, and exact description of the invention, such as will enable others skilled in the art to which it appertains to make and use the same.

My invention relates to wire-reels; and its object is to provide a simple and improved device for reeling up wire, especially barbed fence-wire.

The invention consists in the novel features of construction hereinafter fully described and claimed.

In the accompanying drawings, Figure 1 is a perspective view of a portion of a wagon with my improved reel attachment applied thereto, and Fig. 2 is a plan view of the same.

A base 1 is provided with bolts 2 for fastening said base to a wagon or other vehicle. Standards 3 are firmly attached to said base and are provided at their upper ends with journals (one of which is a Y-journal) for the spool-shaft. Upright guides 4 are secured to the base and are situated between the standards. These upright guides stand between the sides of the spool 6 when the latter is in place and limit the lateral play of the wire. A shaft 5, having a crank-handle 7, rests in the journals of the standards and is provided with a projection 8 to engage and hold the spool against relative rotation. This construction conveniently consists of a dog riveted upon the shaft. I provide a laterally-moving guide through which the wire passes on its way to the spool and a handle to reciprocate it along the face thereof. The preferred form of this guide consists of a bar 9, pivoted to the reel-base and having a handle 10 attached thereto, and a funnel-formed guide 11, pivoted at the end of the bar.

The handle 10 is of such construction as will permit it to be operated from either side of the device, and the guide 11, being pivoted upon the opposite end of the bar 9, will permit the same to be moved from one side of the reel to the other with less friction than if held rigidly thereon.

In operation my device is attached to the box of a wagon and projects to one side. A spool is slipped on the shaft and fastened thereto by the dog. The end of a fence-wire is led through a funnel-shaped guide and is fastened to the spool. The operator then turns the crank-handle with one hand to wind the wire upon the spool and moves the guide to and fro by means of the handle attached thereto with the other hand.

It is readily seen that my device is extremely simple in construction and efficient in operation.

Having thus described my invention, what I claim as new, and desire to secure by Letters Patent, is—

In a reel, a base provided with standards, a shaft supported by said standards and removable therefrom, a projection upon said shaft, devices for turning said shaft, a removable spool mounted upon said shaft in position to be engaged by said projection upon the shaft, upright guides secured to said base and extending upwardly and situated inwardly of the sides of the spool, a pivoted bar upon said base and extending on opposite sides of the same, a funnel-shaped wire-guide pivoted at one end of said bar, and a handle pivoted at the other end of said bar, substantially as described.

In testimony whereof I have signed this specification in the presence of two subscribing witnesses.

CHARLES E. CUMMINS.

Witnesses:
H. C. CUMMINS,
M. J. CUMMINS.